Oct. 9, 1945.    G. J. C. ANDRESEN    2,386,647
METHOD AND APPARATUS FOR DETECTING AND NEUTRALIZING
STATIC CHARGES ON AIRCRAFT OR THE LIKE
Filed Feb. 24, 1941
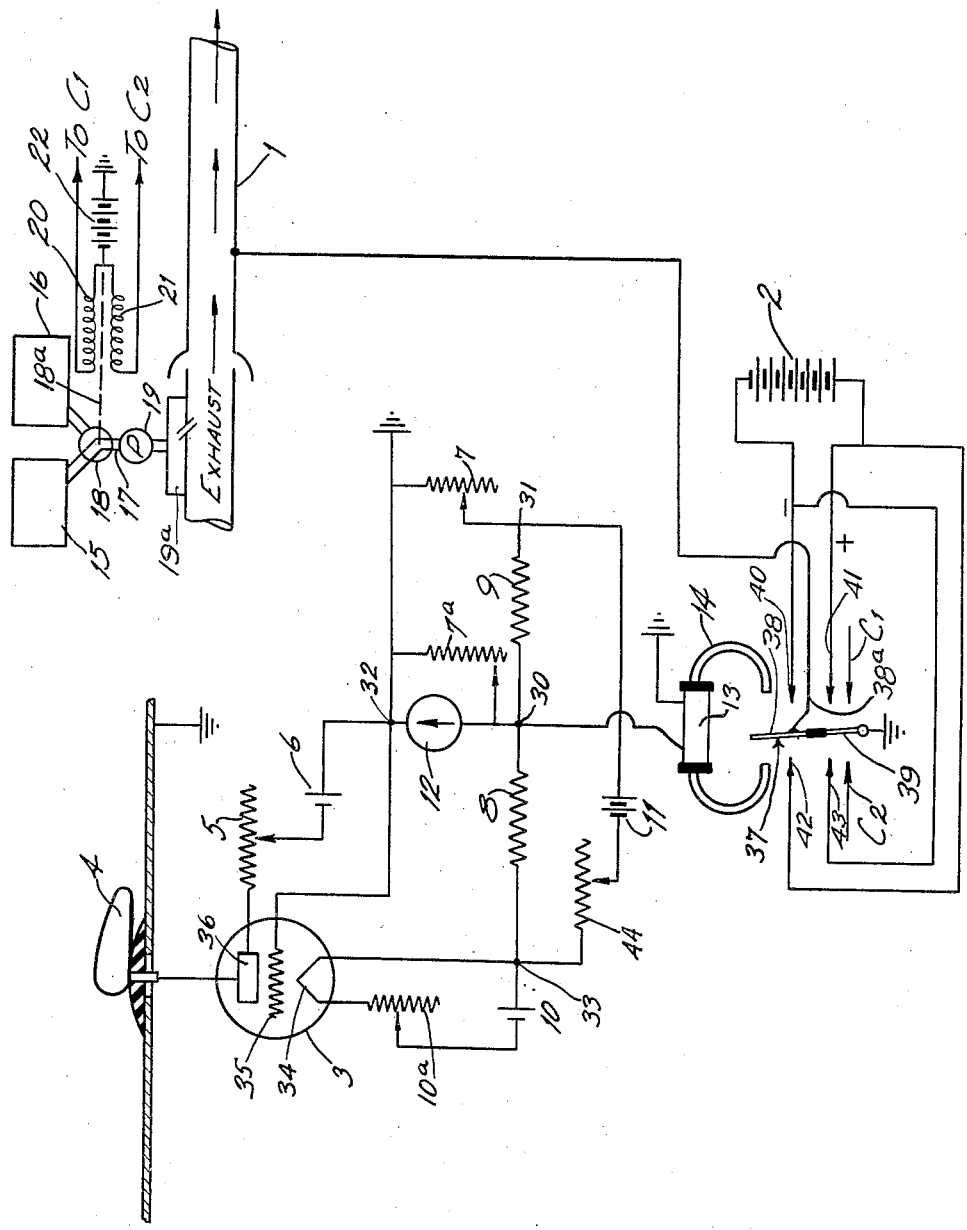
Inventor
Gilbert J. C. Andresen
By Oren & Oren
Attorneys Patented Oct. 9, 1945

2,386,647

UNITED STATES PATENT OFFICE 2,386,647

METHOD AND APPARATUS FOR DETECTING AND NEUTRALIZING STATIC CHARGES ON AIRCRAFT OR THE LIKE

Gilbert J. C. Andresen, Port Clinton, Ohio

Application February 24, 1941, Serial No. 380,400

11 Claims. (Cl. 175—264)

This invention relates to a method and apparatus for detecting and neutralizing static charges on aircraft, and has for its primary object the provision of a simple and efficient apparatus and method, automatic in operation, which will maintain a substantially neutral potential on an airplane with respect to the field through which it is flying.

Another object of the invention is the provision of a novel, highly sensitive detector for static charges.

Other objects and advantages of the invention will become apparent as the description proceeds, reference being had to the accompanying drawing which discloses diagrammatically an apparatus in accordance with the present invention and useful for carrying out the present method.

Air friction and the operation of internal combustion engines produce a static charge on an airplane which increases with time and which sometimes reaches a point where corona discharge takes place from metallic surfaces and materially interferes with the operation of the aircraft and appurtenant radio apparatus. Further, the static charge is dangerous when the aircraft passes through charged bodies such as clouds which may be at an opposite potential to the aircraft, causing a violent discharge from the aircraft. Various suggestions have been made for neutralizing the static charge accumulated, but such efforts have met with only limited success.

The present invention is intended to neutralize the static charge resulting from engine operation and air friction by taking advantage of the fact that the products of combustion from the engine or engines are in an ionized condition, that is, the reactions involved are not yet complete.

In order to neutralize the static charge on an airplane, the present invention contemplates the collection from the exhaust vapors of ions which are opposite in sign to the charge carried by the airplane. Thus, if it is found that the airplane is positive with respect to the field through which it is passing, negative ions are collected from the exhaust vapors in an amount sufficient to neutralize the positive charge carried by the body of the plane. Similarly, if the plane is found to be negative with respect to the field through which it is passing, positive ions are collected from the exhaust vapors. To accomplish this, it is only necessary to provide an insulated independent section 1 of the exhaust manifold through which the exhaust gases must pass and to connect to such section to one side or the other of a source of electric potential such as a battery 2; the other side of the battery or potential source being connected to the body of the plane. The insulated exhaust manifold section thus becomes an ionic collector capable of extracting ions of the desired sign from the vapors passing therethrough.

It is, of course, necessary that some determination of the sign of the static charge carried by the plane be made in order to determine whether the positive or negative terminal of the battery 2 should be connected to the exhaust manifold section 1. In order to accomplish this, the present invention provides a simple and highly sensitive detector in the form of a bridge circuit.

The four arms of the bridge circuit comprise the resistances 7, 8 and 9 and the elements of the triode 3, connected together in bridge form at the junction points 30, 31, 32 and 33. The junction point 32 is connected to ground that is, to the body of the aircraft. Across the opposed junction points 31, 33 is connected the battery 11 through potentiometer 44, the negative pole of the battery being connected to the filament 34 of the triode. Across the junction points 30 and 32 is connected the meter 12 which is shunted by the resistance 7ª. Also across the opposed junction points 30, 32 is the solenoid 13 of a polarized relay 14.

The grid 35 of the triode 3 is connected directly to the junction point 32. The plate 36 is connected to a metallic element 4 which is exposed to the field through which the aircraft is passing, being disposed, for example, in the propeller slip stream, and the plate 4 charges up to the same polarity as the aircraft. The plate 36 is also connected to the junction point 32 of the bridge circuit through the variable potentiometer resistance 5 and the battery 6 which maintains the plate 36 negative with respect to the grid 35.

The filament 34 of the triode is energized by the battery 10 connected through a rheostat 10ª.

The operation of the detector circuit is as follows: The battery applies a constant potential to the bridge circuit across the points 31 and 33, part of this potential being applied across the triode 3. The relative resistances of the four arms of the bridge circuit are such that normally, when the body of the plane is neutral and there is no static charge thereon, there will be no flow of current between the points 30, 32. If a static charge of a certain sign is developed on the plane then the potential on plate 36 is changed and the flow of electrons to the grid 35 is effected, reducing, for instance, the resistance to flow of current through the triode, thereby unbalancing the bridge circuit and resulting in a flow of current across the bridge from point 30 to 32 and consequently through the solenoid 13. If a static charge of a different sign is developed on the plane then the potential of grid 35 will be changed resulting in the resistance to flow of current through the triode being increased. The bridge circuit will thereby be unbalanced in such manner as to cause a flow of current across the bridge in the opposite direction, namely from point 32—30 and consequently a flow of current through solenoid 13 in said opposite direction.

The polarized relay 14 operates an armature in the form of a switch arm 37 which in the embodiment illustrated is made up of two insulated conducting portions 38 and 39, the latter of which is grounded as shown. In one position of operation, the conducting portion 38 is adapted to engage contact 40 which is connected to the negative pole of a battery 2, while the other conducting portion is adapted to engage contacts 41 and C', the former of which is connected to the positive pole of the battery 2. In the other position of operation of the arm 37 the conducting portion 38 is adapted to engage contact 42 which is connected to the positive side of the battery 2 while the other conducting portion 39 is adapted to engage contacts 43 and C², the former of which is connected to the negative pole of the battery 2. The conducting portion 38 is permanently connected by lead 38ᵃ to an insulated portion of the exhaust manifold 1.

The exhaust manifold 1 in the embodiment illustrated has associated therewith a device for supplying thereto vaporized or atomised material which is adapted to be partially ionized by the heat of the exhaust gases. This device includes two tanks 15, 16, the first of which contains material which is adapted when ionized by the exhaust to produce ions which are predominantly positive while the other of which contains material which when ionized by the exhaust is adapted to produce ions which are predominantly negative.

The supply of the material to the exhaust is effected through a three-way valve 18 in the conduit 17 which leads through a pump 19 to a vaporizing chamber 19ᵃ which in turn opens into the exhaust manifold.

The three-way valve is adapted to be operated by suitable means (indicated diagrammatically by the numeral 18ᵃ) to connect either tank 15 or tank 16 to the pump 19 upon operation of one or the other of solenoids 20, 21, one end of each of which is connected to one pole of the battery 22, the other pole of which is grounded to the plane. The other ends of the solenoids 20, 21 are respectively connected to the contacts C¹ and C² of the relay.

It will be apparent that when contact C¹ is engaged by the arm portion 39 of the relay, solenoid 20 will operate the three-way valve so that a selected tank, for example, tank 15 is placed in communication with the conduit 17. The pump 19 will draw liquid from tank 15 and discharge it into the exhaust manifold. On the other hand, when the arm portion 39 of the relay engages contact C², the valve 18 will be moved to place tank 16 into communication with conduit 17 and the pump so that liquid will now be drawn from this tank and discharged into the exhaust manifold.

As an example of the types of liquids which may be used in tanks 15 and 16, it has been found that any hydrocarbon such as light oil will produce a positively charged vapor, and water will produce a negatively charged vapor.

The operation of the detecting and neutralizing apparatus is as follows:

Assume that there is a static charge of a negative sign on the plane. The relay will operate to swing the arm 37 to the right thereby connecting the positive pole of the battery 2 to the ground or plane and connecting the negative pole of the battery to the insulated portion of the exhaust manifold. At the same time solenoid 20 will be energized connecting tank 15 in which, for instance, there is light oil, to the pump 19, whereby liquid will be discharged from said tank 15 to the exhaust. The vapor under the influence of the heated exhaust will be ionized producing ions of a predominantly positive sign and discharged with the exhaust. The positive ions are to some extent attracted toward the negatively biased exhaust manifold, and in any event, there is an abundance of positively charged ions adjacent the manifold and at one end of the circuit of the battery 2, and at the other end of the circuit is an abundance of negatively charged ions on the ground or frame and body of the aircraft. The result is an electron flow through the battery circuit to neutralize the static charge on the aircraft, and once neutralization is effected the current flow in relay 14 ceases and the arm 37 returns to neutral position.

If the static charge is positive the opposite poles of the battery will be connected to the exhaust manifold and ground, and the tank 16, which, for instance, contains water, will be connected to the pump 19 whereby the positive static charge on the plane will be neutralized.

It will be appreciated that the battery 2 could be used without the tanks 15 and 16 and that the tanks 15 and 16 could be used without the battery 2, though the use of the battery and tanks in combination is more effective.

What I claim is:

1. The method of neutralizing a static charge on an aircraft having an internal combustion engine, which includes creating ions in the exhaust gases of the engine of a sign opposite to the sign of the static charge, and directing the charge of the created ions into the aircraft to neutralize the static charge thereon.

2. The method of neutralizing a static charge on an aircraft having an internal combustion engine, which includes determining the polarity of the static charge on the aircraft, and discharging vapors into the exhaust gases of the engine to create ions bearing a polarity opposite to that on the aircraft, and directing the charge of the ions to neutralize the static charge on the aircraft.

3. That method of neutralizing a static charge on a body, which includes the steps of creating ions of a polarity opposite to those charging the body, and electrically connecting the charge of the created ions to the body to substantially neutralize the static charge on the body.

4. That method of neutralizing a static charge on a body, which includes the steps of determining the polarity of the static charge on the body, creating ions of a polarity opposite to those charging the body, and electrically connecting the charge of the created ions to the body to substantially neutralize the static charge on the body.

5. Apparatus for neutralizing a static charge on a body, including means for determining the polarity of the static charge on the body, means creating a source of positive or negative electrical charge, and means controlled by the determining means for electrically connecting the source of the electrical charge to the body with a polarity opposite to that of the body.

6. Apparatus for substantially neutralizing an electrical charge on a body having an internal combustion engine, such as an aircraft, including means for generating positive ions in the exhaust gases of the engine, mechanism for generating negative ions in the exhaust gases of the engine, means for initiating the operation of the means or the mechanism and for electrically connecting the charge of the ions created thereby to the body, and a selector device for causing the creation of ions of a polarity opposite to those charging the body.

7. Apparatus for substantially neutralizing an electrical charge on a body having an internal combustion engine, such as an aircraft, including means for generating positive ions in the exhaust gases of the engine, mechanism for generating negative ions in the exhaust gases of the engine, and means for initiating the operation of the means or the mechanism and for electrically connecting the charge of the ions created thereby to the body.

8. Apparatus for substantially neutralizing an electrical charge on a body, including a battery, a double pole, double throw switch for connecting the battery to the body to neutralize substantially either a negative or a positive electrical charge on the body, and means operated by the electrical charge on the body for controlling the operation of the switch.

9. The method of neutralizing the static charge on an aircraft having an internal combustion engine, which includes determining the sign of the charge with respect to the medium through which the aircraft is passing, extracting ions of the opposite sign from the exhaust vapors of the internal combustion engine, and electrically connecting the charge of said oppositely charged ions to the aircraft to neutralize the static charge on the aircraft.

10. In an apparatus for neutralizing the static charge on an aircraft body having an internal combustion engine, which includes means to determine the sign of the static charge with respect to the medium through which the aircraft is passing, and means to extract ions of the opposite sign from the exhaust vapors of the internal combustion engine and to apply the charge thereof to the aircraft.

11. Apparatus in accordance with claim 10, and automatic means, controlled by the static charge of the medium through which the aircraft is passing, to reverse the potential of the ions to be extracted from the exhaust vapors.

GILBERT J. C. ANDRESEN.